US011757806B2

(12) United States Patent
Yip et al.

(10) Patent No.: US 11,757,806 B2
(45) Date of Patent: Sep. 12, 2023

(54) PUBLISHER AND SHARE ACTION INTEGRATION IN A USER INTERFACE FOR AUTOMATED MESSAGING

(71) Applicant: salesforce.com, inc., San Francisco, CA (US)

(72) Inventors: Eric Shu Wang Yip, San Francisco, CA (US); Ning Tai, Castro Valley, CA (US); Ishita Shah, Newark, CA (US); Cuong Si The Dong, San Jose, CA (US); Jose Garcia, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/305,113

(22) Filed: Jun. 30, 2021

(65) Prior Publication Data

US 2021/0400000 A1    Dec. 23, 2021

Related U.S. Application Data

(63) Continuation of application No. 16/743,964, filed on Jan. 15, 2020, now Pat. No. 11,075,863, which is a (Continued)

(51) Int. Cl.
*H04L 51/214* (2022.01)
*H04L 51/02* (2022.01)
(Continued)

(52) U.S. Cl.
CPC ............ *H04L 51/02* (2013.01); *G06F 16/903* (2019.01); *G06Q 50/01* (2013.01); *H04L 51/214* (2022.05);
(Continued)

(58) Field of Classification Search
CPC ......... H04L 51/02; H04L 51/14; H04L 67/02; H04L 67/04; H04L 67/12; H04L 67/20; H04L 67/306; G06F 16/903; G06Q 50/01
See application file for complete search history.

(56) References Cited

U.S. PATENT DOCUMENTS 5,577,188 A    11/1996  Zhu
5,608,872 A     3/1997  Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Beau D Spratt
(74) *Attorney, Agent, or Firm* — Weaver Austin Villeneuve & Sampson LLP

(57) ABSTRACT

Disclosed are some implementations of systems, apparatus, methods and computer program products for publisher and share action integration in a user interface (UI) for automated messaging. In some implementations, information is displayed in a first component and in a second component in a UI on a display. The first component is a publisher configured for composing and sharing messages on different communication channels using different share actions. The second component includes links to data items. When one of the data items is selected, a set of share actions for sharing the selected item using the publisher can be identified and displayed. When one of the displayed share actions is selected, it can be determined that the selected share action is applicable to one of the communication channels. A reference to the selected item can be provided in a message being composed in the publisher for sharing on the one communication channel.

20 Claims, 10 Drawing Sheets

Related U.S. Application Data continuation of application No. 15/142,884, filed on Apr. 29, 2016, now Pat. No. 10,567,311.

(51) Int. Cl.
  *H04L 67/12* (2022.01)
  *G06F 16/903* (2019.01)
  *G06Q 50/00* (2012.01)
  *H04L 67/04* (2022.01)
  *H04L 67/02* (2022.01)
  *H04L 67/53* (2022.01)
  *H04L 67/306* (2022.01)

(52) U.S. Cl.
  CPC .............. *H04L 67/02* (2013.01); *H04L 67/04* (2013.01); *H04L 67/12* (2013.01); *H04L 67/53* (2022.05); *H04L 67/306* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,094,355 B1 | 7/2015 | Duddu et al. |
| 9,986,376 B1 | 5/2018 | Anima et al. |
| 10,567,311 B2 | 2/2020 | Yip et al. |
| 11,075,863 B2 | 7/2021 | Yip et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |

(56) References Cited

U.S. PATENT DOCUMENTS

| | | |
|---|---|---|
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0174167 A1* | 7/2007 | Natella ................. G06Q 40/06 705/36 R |
| 2008/0155588 A1 | 6/2008 | Roberts et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0125511 A1* | 5/2009 | Kumar ................. G06Q 10/107 707/999.005 |
| 2009/0177744 A1 | 7/2009 | Marlow et al. |
| 2009/0234876 A1* | 9/2009 | Schigel ................. H04L 51/02 707/999.102 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0109836 A1 | 5/2012 | Chen et al. |
| 2012/0159349 A1* | 6/2012 | Kansky ............... G06F 3/04847 715/752 |
| 2012/0197881 A1* | 8/2012 | Blue ..................... G06F 16/951 707/727 |
| 2012/0197980 A1 | 8/2012 | Terleski et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0262168 A1* | 10/2013 | Makanawala ........ G06Q 30/016 705/7.14 |
| 2013/0282603 A1* | 10/2013 | Gaedcke ............... G06F 40/289 705/319 |
| 2014/0052644 A1* | 2/2014 | Ott ....................... G06Q 30/016 705/304 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0143248 A1 | 5/2015 | Beechuk et al. |
| 2015/0172563 A1 | 6/2015 | Jakobson et al. |
| 2015/0269488 A1* | 9/2015 | Galai ................. G06F 17/30867 706/11 |
| 2016/0127358 A1 | 5/2016 | Engelking |
| 2016/0283947 A1 | 9/2016 | Yip et al. |
| 2017/0103361 A1* | 4/2017 | Ungerboeck .. G06Q 10/063114 |
| 2017/0161281 A1 | 6/2017 | Bharti et al. |
| 2017/0315680 A1 | 11/2017 | Yip et al. |
| 2021/0400000 A1 | 12/2021 | Yip et al. |

OTHER PUBLICATIONS

U.S. Appl. No. 14/669,691, inventors Yip, et al., filed Mar. 26, 2015.
U.S. Final Office Action dated Oct. 1, 2018 issued in U.S. Appl. No. 15/142,884.
U.S. Notice of Allowance dated Oct. 9, 2019 issued in U.S. Appl. No. 15/142,884.
U.S. Notice of Allowance dated Mar. 25, 2021 issued in U.S. Appl. No. 16/743,964.
U.S. Office Action dated Mar. 26, 2018 issued in U.S. Appl. No. 15/142,884.
U.S. Office Action dated May 2, 2019 issued in U.S. Appl. No. 15/142,884.
U.S. Office Action dated Sep. 25, 2020 issued in U.S. Appl. No. 16/743,964.

* cited by examiner

PUBLISHER AND SHARE ACTION INTEGRATION IN A USER INTERFACE FOR AUTOMATED MESSAGING

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This patent document generally relates to a publisher in a user interface that provides electronic messaging using different communication channels. More specifically, this patent document discloses techniques for automated messaging in the publisher in relation to share actions for sharing electronic data.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, email systems, and instant messaging systems, by way of example, in a cloud computing environment.

BRIEF DESCRIPTION OF THE DRAWINGS

The included drawings are for illustrative purposes and serve only to provide examples of possible structures and operations for the disclosed systems, apparatus, methods and computer program products providing publisher and share action integration in a user interface for automated messaging. These drawings in no way limit any changes in form and detail that may be made by one skilled in the art without departing from the spirit and scope of the disclosed implementations.

FIG. 1 shows an example of a user interface (UI) 100 providing publisher and share action integration for automated messaging, in accordance with some implementations.

FIGS. 3 and 4 show examples of different states of UI 100, in accordance with some implementations.

FIGS. 6 and 7 show examples of different states of UI 100, in accordance with some implementations.

DETAILED DESCRIPTION

Figure 2:
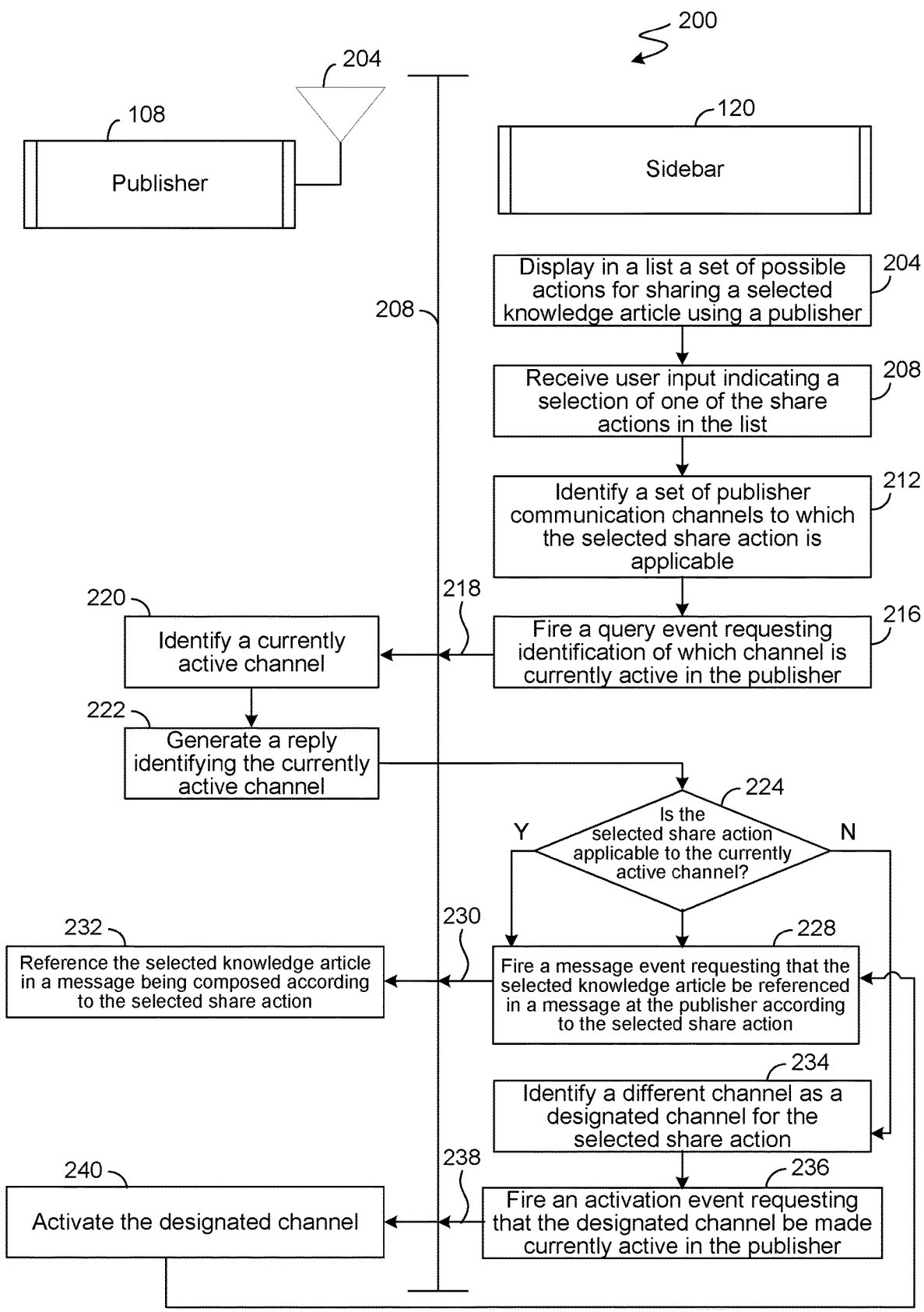
FIG. 2 shows a flowchart of an example of a method 200 providing publisher and share action integration for automated messaging, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to provide publisher and share action integration in a user interface (UI) for automated messaging. For example, a publisher in a UI can be a single graphical tool configured to publish electronic messages on any of a variety of communication channels, which the publisher can access. In some implementations, the publisher is one of several or many components in a UI and is operable as a central communications hub for a user viewing the UI to: 1) manually select any of the available channels such as email, public social networks, private social networks, social network communities, instant messaging, etc., 2) compose a message, and 3) click a "share", "publish" or similar button in the UI to cause the publisher to share the composed message on the selected channel.

In some of the disclosed implementations, techniques are provided for automating channel selection and message generation in the publisher in relation to user selection of share actions for sharing electronic data. For instance, while a publisher is rendered and operable in one graphical component of a UI, an independently operable sidebar can be rendered in a different graphical component of the same UI. This sidebar can be configured to provide a list of data items, which can be shared in various manners. In some implementations, when one of a number of available actions for sharing a particular data item in the sidebar is selected, techniques are disclosed for the sidebar to automatically interact with the publisher to cause the publisher to switch to an appropriate communication channel and/or compose a message with a reference to the particular data item. In some instances, implementation of some of the disclosed techniques can significantly reduce user time and energy wasted in conventional systems where a user manually navigates among numerous windows in a UI and performs numerous manual steps to attempt to identify an appropriate share action for a data item in the sidebar and identify an appropriate channel in the publisher before a message can be shared, oftentimes in a setting where time is of the essence to satisfy an objective.

In some implementations, in response to a user selecting one of a set of possible share actions for a particular data item listed in the sidebar, the sidebar queries the publisher to see which communication channel is currently active in the publisher. If the sidebar then determines that the selected share action is applicable to the currently active channel, the sidebar directs the publisher to perform the share action. On the other hand, if the selected share action is not applicable to the currently active channel, the sidebar instructs the publisher to switch channels to a default or other designated channel where the selected action is applicable, before directing the publisher to perform the share action.

By way of illustration, Roy is a customer call center agent responsible for handling customer concerns and complaints regarding widgets sold by ABC, Inc. Roy uses an online platform providing a UI with different independently rendered and operable components: a first component with a publisher as generally described above, a second component with a knowledge article sidebar providing search functionality of knowledge articles stored in an appropriate data repository, and a third component providing customer relationship management (CRM) database access and workflow automation. When Roy uses the third component to pull up a CRM record, such as a particular case tracking a customer complaint, Roy can then use the sidebar to search for and identify knowledge articles having keywords related to the complaint. When Roy sees that the sidebar has been populated with a list of search results identifying some relevant articles, which may contain instructions or insight for how to solve the case, Roy can use some of the disclosed techniques to quickly share a particular article on the appropriate publisher channel. For instance, if the customer originally submitted the complaint by email, Roy can select a "share via email" action in a drop-down list of possible share actions displayed next to the article in the sidebar, automatically causing both: 1) the email channel to be activated in the publisher if a different channel is currently active, and 2) a public Uniform Resource Locator (URL) to the article to be embedded as content in the body of an email being composed at the publisher.

Figure 1:
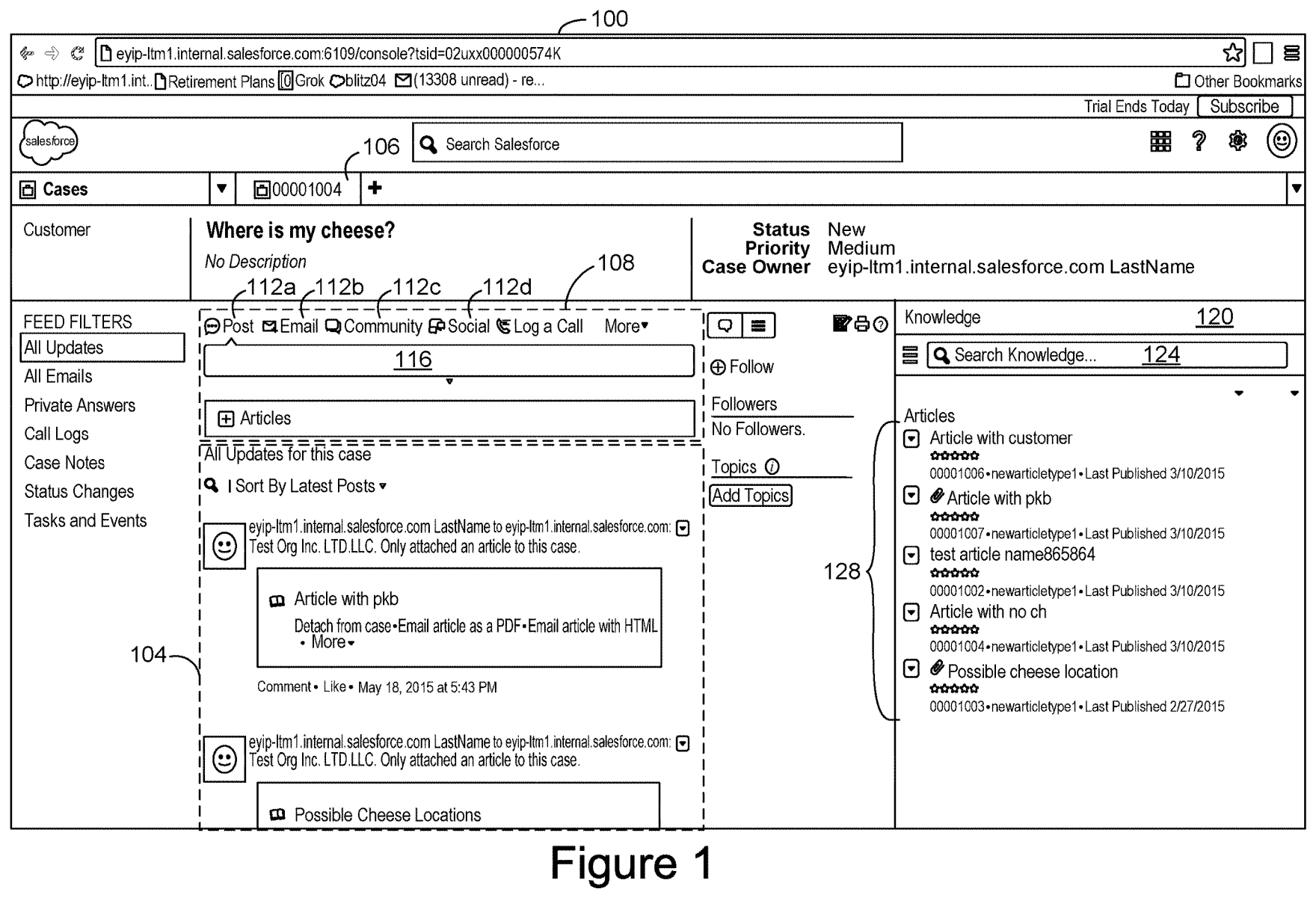

FIG. 1 shows an example of a UI 100 providing publisher and share action integration for automated messaging, in accordance with some implementations. In FIG. 1, UI 100 includes a variety of graphical components situated at different locations in UI 100. These components include a record feed 104 dedicated to a particular CRM record, case 00001004, as indicated by tab 106. Record feed 104 includes various feed items specific to the case. Tab 106 is one of possibly several or many tabs, which can be opened in UI 100, where each tab can be selected to access a respective page dedicated to a particular CRM record, feed, or other construct.

In FIG. 1, another component of UI 100 is a publisher 108. In this example, publisher 108 is configured with a number of tabs 112*a-d*, any of which a user can click on to select a particular communication channel accessible by publisher 108. In this configuration, at any given time, only one tab and associated communication channel is active in publisher 108. For example, a user can click on post tab 112*a* to post to record feed 104 or another feed of a social networking or other communications system when the user wishes to compose and share a post on that channel. When tab 112*a* is active, tabs 112*b-d* and associated communication channels are inactive in publisher 108. By the same token, a user can click on email tab 112*b* to de-activate post tab 112*a* in publisher 108 and activate email as the desired communication channel. A community tab 112*c* activates a specific public or private community within a social networking system as the desired communication channel, while social tab 112*d* activates a feed of a designated social networking system, such as Facebook or Twitter. When a user clicks on any of tabs 112*a-d*, publisher 108 opens a data entry field, such as post field 116, of a post template. The user can then type content into field 116 to compose a post or other social media message to be shared on a channel associated with post tab 112*a*.

Other various communication channels can be linked with tabs of publisher 108, such as a social network internal to an organization, a social network community for specific subsets of users of an organization such as a team of employees or customers associated with a particular account, a particular social network group, etc. Those skilled in the art should appreciate that publisher 108 is configurable to access a variety of communication channels as desired for a particular environment, such as a customer call center or a consumer-oriented website.

In FIG. 1, another component in UI 100 is a knowledge sidebar 120, which can be used to search for information to help resolve the case identified by tab 106. A search field 124 in sidebar 120 allows the user to enter keywords and search one or more databases or other resources storing and/or identifying knowledge articles. When knowledge articles or other data items are identified by running such a search, a list 128 of identified knowledge articles is generated and displayed in sidebar 120. Those skilled in the art should appreciate that list 128 of FIG. 1 is one of many examples of presentations of data items displayable in sidebar 120. In some other implementations, other data items in the form of documents, files, database records, webpages, etc. can be identified by sidebar 120 as relevant to a search query and presented in list 128 or another suitable graphical presentation.

In some implementations, some or all of the operability and any interoperability of components in UI 100 are event-driven. In the example of FIG. 1, each component 104, 108 or 120 exists and operates independently of the other components present in UI 100. Each component 104, 108 or 120 is configurable to listen for certain events and perform some designated operations and/or processing, such as execution of a callback function when a designated event is detected. A global event-based communication framework, for instance, using JavaScript, can be provided by a browser or other program generating UI 100. In some implementations, the event-driven mechanism of JavaScript can be a foundation and can be customized, for instance, to enable a particular knowledge article in list 128 to be attached to case 00001004 of FIG. 1. When a certain action is taken with respect to or within a component, global events can be fired and received by other components via the event-based communication framework, also referred to herein as an event framework. For example, after a knowledge article is attached to case 00001004, a global event is fired indicating that the article attachment has been completed. Then any other components listening for events via the event framework will be notified of the attachment, and such components can determine whether to perform some additional operation(s) and/or processing.

In the example of FIG. 1, each component is also driven by a combination of server-side and client-side processing, where the client-side processing often occurs within or in relation to a browser running on a user's device. There is two-way communication at the user's device between pairs of components, such as between publisher 108 and sidebar 120. Thus, when an action is initiated in sidebar 120, by way of illustration, sidebar 120 can fire a global event to query the global space of tab 106 via the event framework to see what other components in UI 100 are currently active. Publisher 108, configured with an event listener to listen for global events via the event framework, can immediately receive and respond to the global event with an appropriate reply, such as "publisher active." This reply is relayed to sidebar 120, which can perform appropriate additional processing and/or initiate additional operations.

In some implementations, when there are no tabs or only a single tab open in UI 100, the event framework acts as an intermediary between any components in the UI. In some other implementations, the event framework is bound to only a particular tab or page of a UI, as in the example of FIG. 1. Thus, in FIG. 1, global events are fired only within a specific tab. In this example, an independently operating publisher and/or sidebar in a different tab, e.g., for a different CRM record than case 00001004, would have a different event framework and would not be notified of global events or other communications by publisher 108 and sidebar 120.

Those skilled in the art should appreciate that the disclosed techniques are not limited to an event framework as described above. In some other implementations, other communications mechanisms can provide a medium for independently operating components of a UI such as a publisher and a sidebar to communicate with each other.

Figure 3:
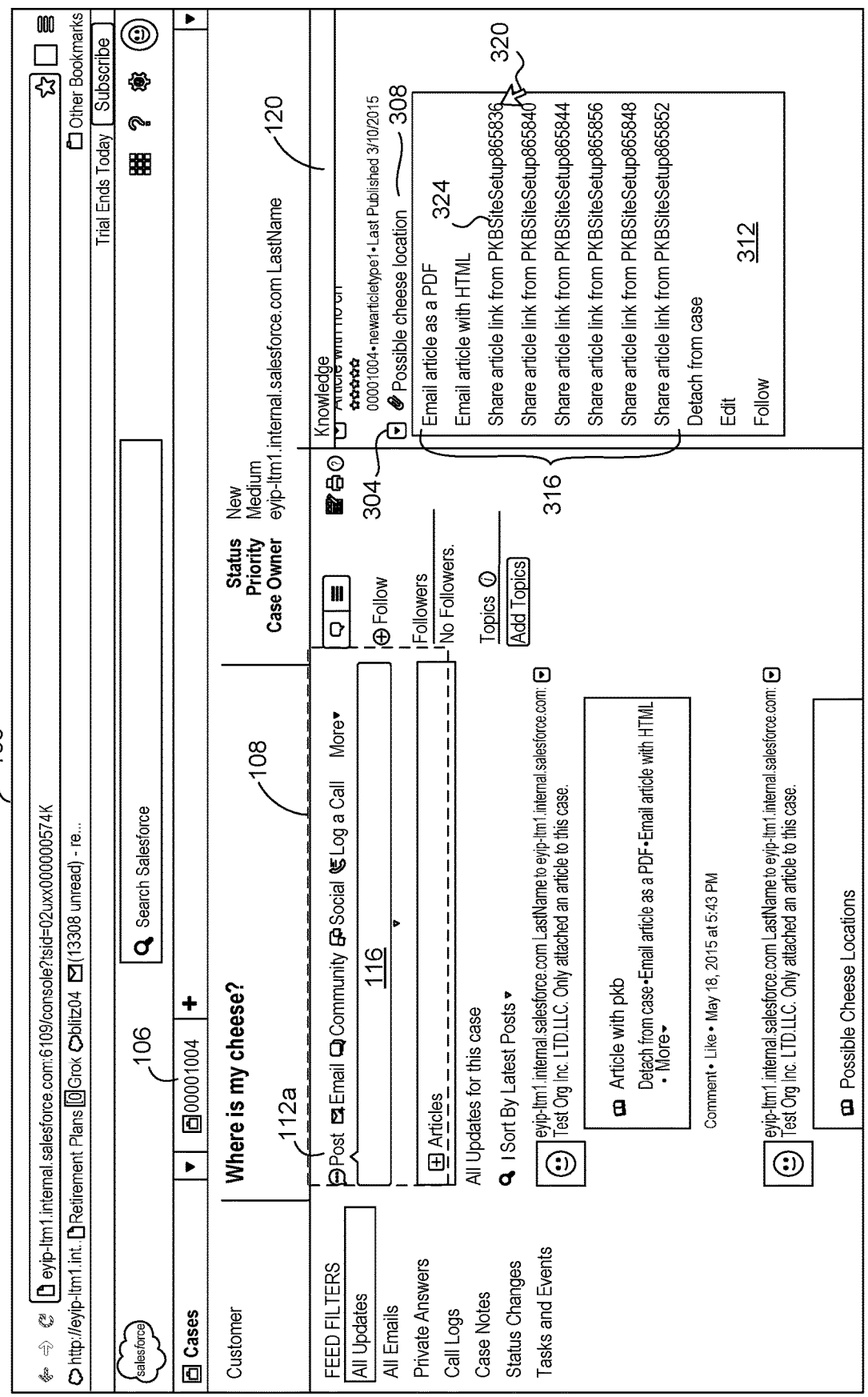

FIG. 2 shows a flowchart of an example of a method 200 for publisher and share action integration for automated messaging, in accordance with some implementations. In FIG. 2, publisher 108 of FIG. 1 is configured with an event listener 204 to listen for global events on an event framework 208. At 204 of FIG. 2, sidebar 120 displays a set of possible actions for sharing a selected knowledge article. By way of illustration, in FIG. 3, a user has clicked on a pull-down link 304 of a particular knowledge article 308 to select article 308 and cause a drop-down list 312 to be displayed in sidebar 120. In FIG. 3, a set of available share actions 316 providing different manners of sharing article 308 is set forth in list 312.

Returning to FIG. 2, at 208, user input indicating a selection of one of share actions 316 in list 312 of FIG. 3 is received. For example, in FIG. 3, a user can move a mouse pointer 320 over share action 324 and click on action 324. Returning to FIG. 2, after a desired share action has been selected at 208, at 212, sidebar 120 is configured to identify a set of communication channels to which selected share action 324 is applicable. For example, a list of available communication channels for each possible share action for sharing knowledge articles or other types of data items in sidebar 120 can be maintained in a database of a cloud-based database system.

In FIG. 2, at 216, which can occur after, before or concurrent with any of 204, 208 and 212, sidebar 120 fires a global event in the form of a query event 218 requesting identification of which channel is currently active in publisher 108. Thus, in FIG. 3, when the user selects share action 324 to share a URL identifying article 308, this selection causes query event 218 to be fired as a global event, for example, within the current page displayed by a browser program. Query event 218 is communicated on framework 208. Thus, event listener 204 of publisher 108 allows publisher 108 to receive query event 218.

In FIG. 2, at 220, when event listener 204 picks up query event 218, publisher 108 is configured to respond to the query by identifying a channel associated with post tab 112a in the example of FIG. 3 as being currently active. Those skilled in the art should appreciate that any of the various communication channels available through publisher 108 can be currently active at the time query event 218 is received and processed by publisher 108 via event listener 204.

In FIG. 2, when the channel associated with post tab 112a is identified as being currently active in publisher 108, at 222, publisher 108 is configured to respond to query event 218 by generating a reply identifying the currently active channel. This reply is communicated back to sidebar 120 for additional processing, as shown in FIG. 2.

In FIG. 2, in response to the reply from publisher 108, at 224, sidebar 120 checks whether selected share action 324 is applicable to the currently active channel. For example, as mentioned above, a list of publisher channels to which each possible share action is applicable can be maintained at a database and checked at 224. In FIG. 2, at 228, when sidebar 120 determines that selected share action 324 is applicable to the currently active channel in publisher 108, sidebar 200 fires another global event in the form of message event 230 requesting that selected share action 324 be referenced in a message being composed or capable of being composed in publisher 108. Thus, when publisher 108 receives message event 230 via event listener 204, at 232, publisher 108 inserts a reference to article 308 in field 116 of FIG. 3 in accordance with share action 324. In other words, since selected share action 324 specifies that a URL to article 308 is to be shared, in this example, the URL is pasted as content into field 116 of a post being composed using publisher 108.

Returning to 224 of FIG. 2, when selected share action 324 is not applicable to the currently active channel, at 234, sidebar 120 identifies a different one of the available channels at publisher 108 as a default channel appropriate for selected share action 324. Those skilled in the art should appreciate that, at 234, a list of default channels or otherwise designated channels for particular share actions can be maintained in a database and referenced as needed by sidebar 120 during the flow of FIG. 2 and of other methods disclosed herein. Thus, following the identification of an appropriate channel, at 236, sidebar 120 fires another global event in the form of an activation event 238 requesting that the default channel for action 324 be made currently active in publisher 108. In the example of FIG. 3, if sidebar 120 has identified the email channel as a default channel for share action 324, activation event 238 instructs publisher 108 to switch channels to the email channel.

Figure 4:
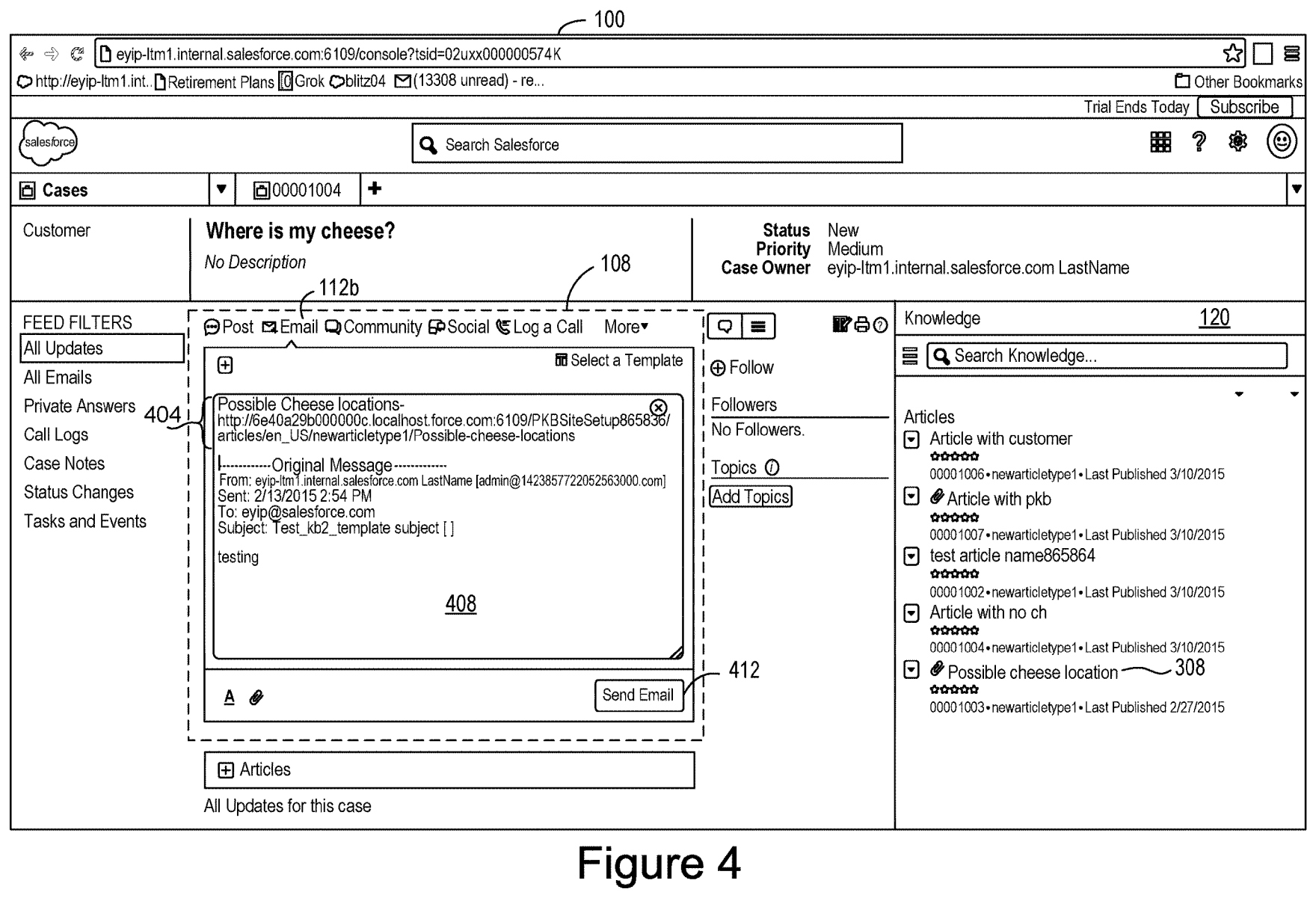

In FIG. 2, at 240, in response to publisher 108 receiving activation event 238, publisher 108 switches to the email channel, as shown in FIG. 4 with email tab 112b being emphasized. Returning to FIG. 2, flow proceeds from 240 to 228 and 232 as described above. Thus, in FIG. 4, a URL 404 to article 308 has been embedded inline in a body 408 of an email being composed within publisher 108.

In the example of FIG. 4, the email being composed within publisher 108 is in the form of a reply to a customer inquiry submitted via email. After URL 404 is automatically pasted in body 408 of the email being composed at publisher 108, a user can enter additional comments as desired before clicking a send button 412 to cause the email to be sent back to the customer as a reply to the customer's original email.

In some implementations, a server can be configured to perform one or more of the operations disclosed herein for publisher and share action integration in a user interface for automated messaging. In some implementations, such as the example of FIG. 2, a number of operations are performed primarily at a user device by components communicating with each other within a browser running at the user device. However, in some other implementations, a server sends instructions to a user device to cause one or more of such operations to be performed. In some other implementations, one or more operations are performed partially or entirely by a server. Thus, in the example of FIG. 5, it should be understood that one or more of operations described in 504-540 can be initiated by a server or performed partially or entirely by a server, as those skilled in the art should appreciate.

Figure 5:
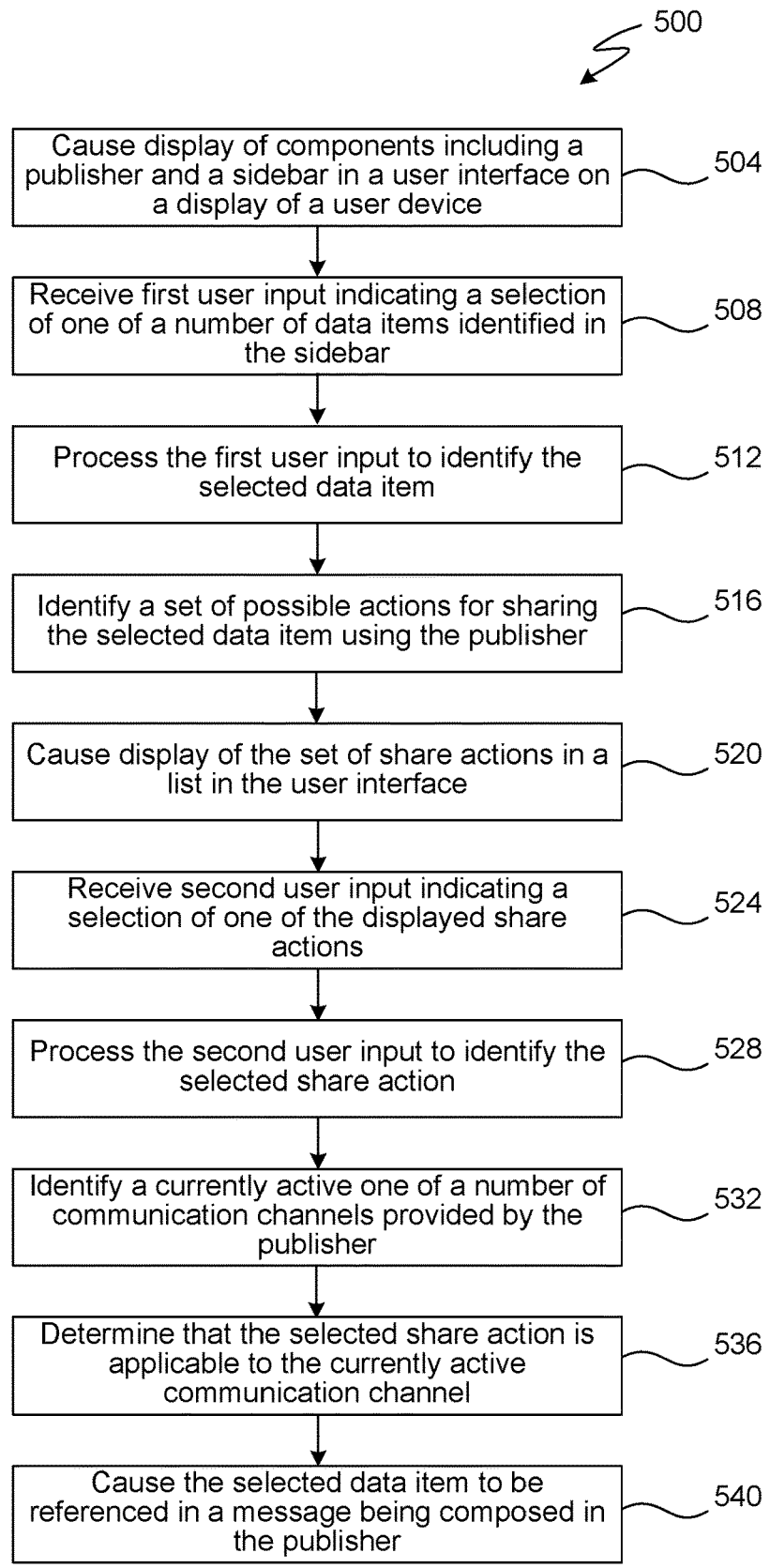
FIG. 5 shows a flowchart of an example of a method 500 providing publisher and share action integration for automated messaging, in accordance with some implementations.

In FIG. 5, at 504, a computing device such as a server can cause a user device to display any number of components including a publisher and a sidebar in a user interface. For example, as described above with reference to FIGS. 1, 3 and 4, publisher 108 and sidebar 120 can be presented as components of UI 100. As described above with reference to FIG. 1, sidebar 120 can be populated with list 128 of relevant knowledge articles.

Returning to FIG. 5, at 508, first user input indicating a selection of a particular knowledge article or other type of data item identified in list 128 is received, for instance, by the selection of pull-down link 304 adjacent to desired knowledge article 308, as shown in FIG. 3. Returning to 508 of FIG. 5, other examples of selecting a desired data item such as a knowledge article include a user hovering a mouse pointer over the desired item, the user touching the desired item on a touch screen-enabled device or a user clicking on the desired data item with a mouse. This first user input at 508 is generally submitted by the user at the user device but can be transmitted to a server or other computing device than the user device for additional processing.

Figure 6:
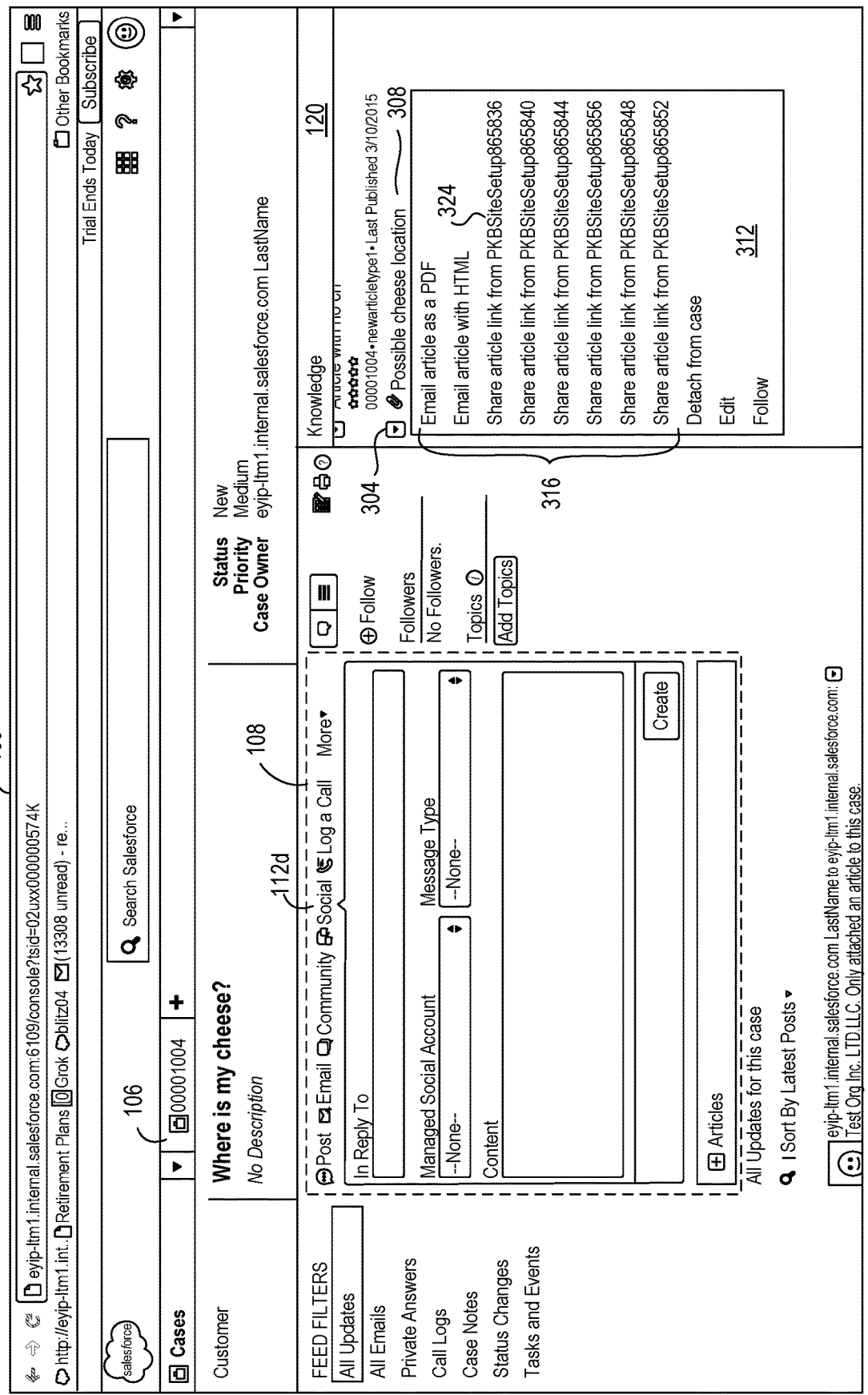

Returning to FIG. 5, at 512, the first user input received at 508 is processed by a server or user device to identify the selected data item. For example, as shown in FIGS. 3 and 6, user input selecting pull-down link 304 associated with knowledge article 308 can be processed at 512 of FIG. 5 to identify article 308 as the selected data item. At 516 of FIG. 5, a set of possible share actions for sharing the selected data item using the publisher is identified.

At 520, after possible share actions are identified for a given data item such as a knowledge article, the set of possible share actions is displayed in a list. For example, a server can send an instruction to the user device to display list 312 with share actions 316 identified at 516, as shown in FIGS. 3 and 6. In some implementations, a set of share actions available for a given data item is loaded in a page by a browser but hidden until a user selects a desired data item, for instance, by clicking on pull-down link 304, to cause the set to be revealed in list 312 of FIG. 6. Thus, a separate list of available share actions for each knowledge article in list 128 of FIG. 1 can be populated when UI 100 is loaded or when list 128 is generated. When a particular article is selected, the associated list of available share actions for that article is exposed, as shown in FIGS. 3 and 6. In the example of FIGS. 5 and 6, lists of available share actions for each article were generated and provided to the user device from a server independent of user input and in response to a search query run through sidebar 120.

Returning to FIG. 5, at 524, second user input is received indicating a selection of one of share actions 316 in list 312. For example, in FIGS. 3 and 6, a user has clicked on share action 324 as a desired mode of sharing knowledge article 308. In FIG. 5, at 528, the second user input received at 524 is processed to identify the selected share action. As with the processing of the first user input at 512, the second user input at 528 can be handed by a server after such user input is relayed from the user device to the server. At 532 of FIG. 5, the server or the user device identifies which communication channel provided by the publisher is currently active. In the example of FIG. 6, a particular social networking system is the currently active communication channel, as indicated by social tab 112d in publisher 108.

Figure 7:
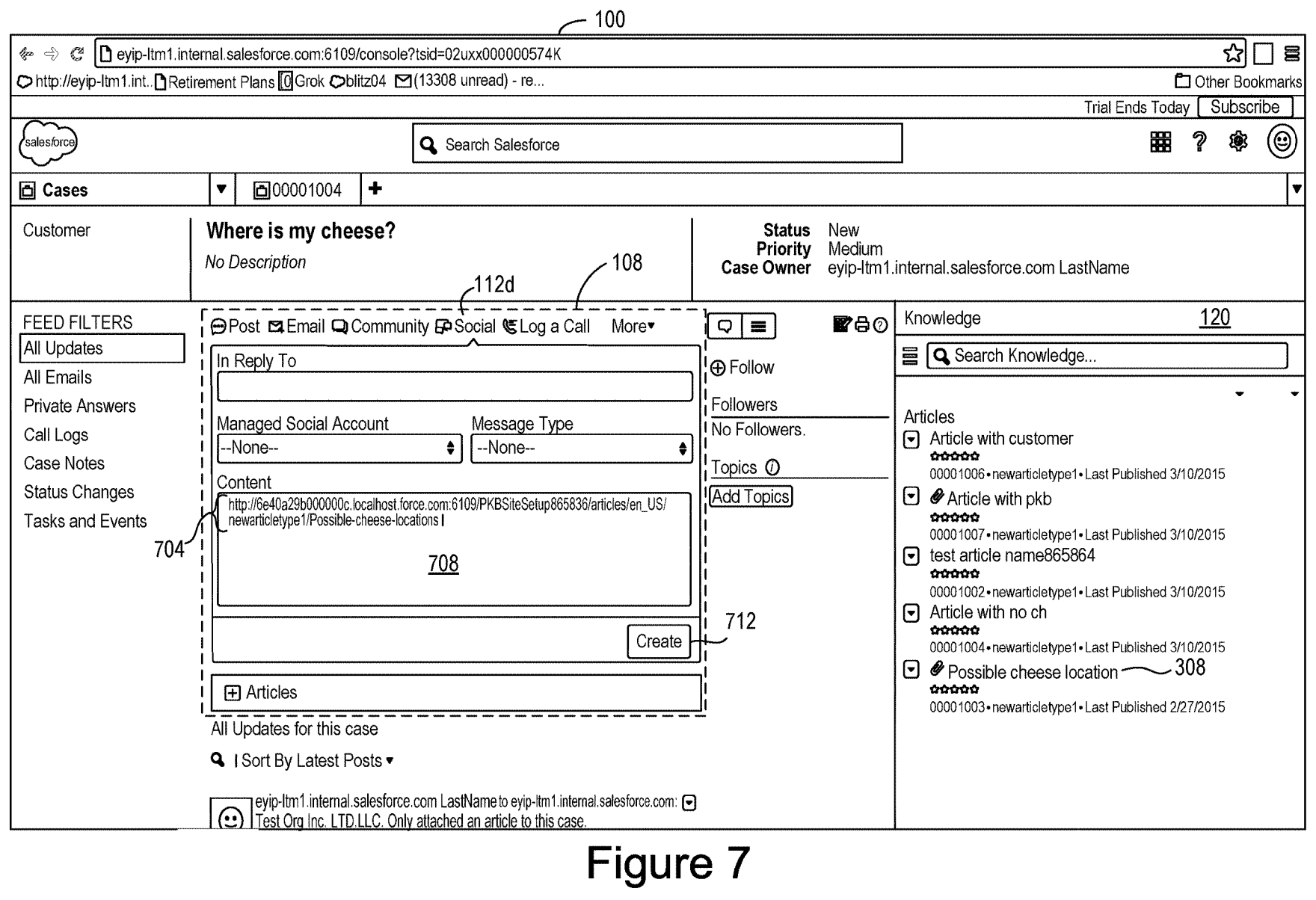

In the example of FIG. 5, at 536, a server or the user device determines that the selected share action is applicable to the currently active communication channel. Thus, similar to the flow of 224 to 228 of FIG. 2, since share action 324 of FIG. 6 is applicable to the social networking system channel currently active in publisher 108 of FIG. 6, the selected knowledge article 308 can be immediately shared. Thus, at 540 of FIG. 5, a server or the user device causes a reference to the selected data item such as knowledge article 308 of FIG. 6 to be inserted in a message being composed at publisher 108. For example, in FIG. 7, a URL 704 to knowledge article 308 has been inserted as a link in content field 708 of a social media message being composed within publisher 108. A user can then post the social media message to a particular social networking system associated with social tab 112d upon clicking a create button 712 of FIG. 7. Those skilled in the art should appreciate that knowledge articles can be shared in various alternative ways, such as attaching the article to a message or attaching metadata identifying the article to a message.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
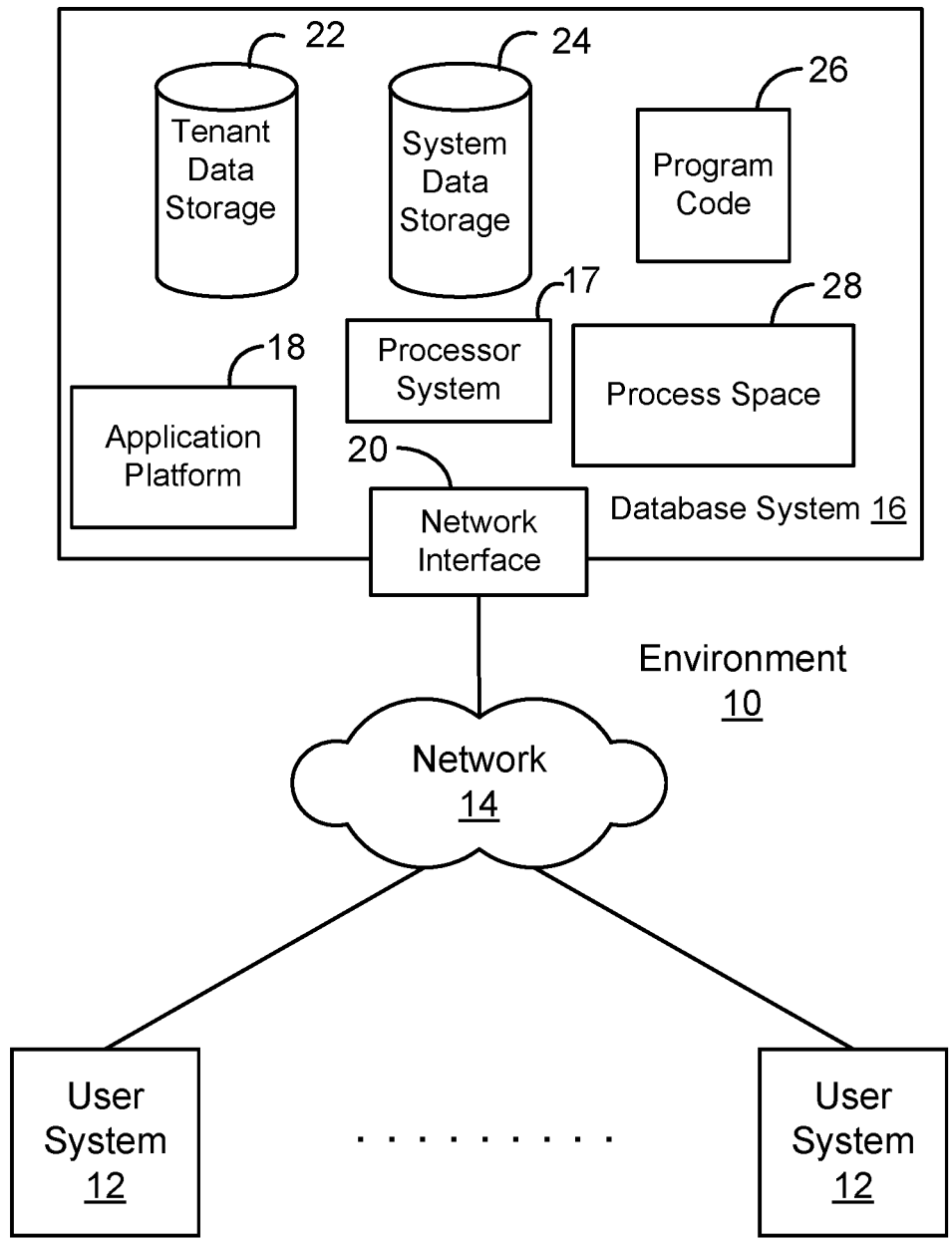
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
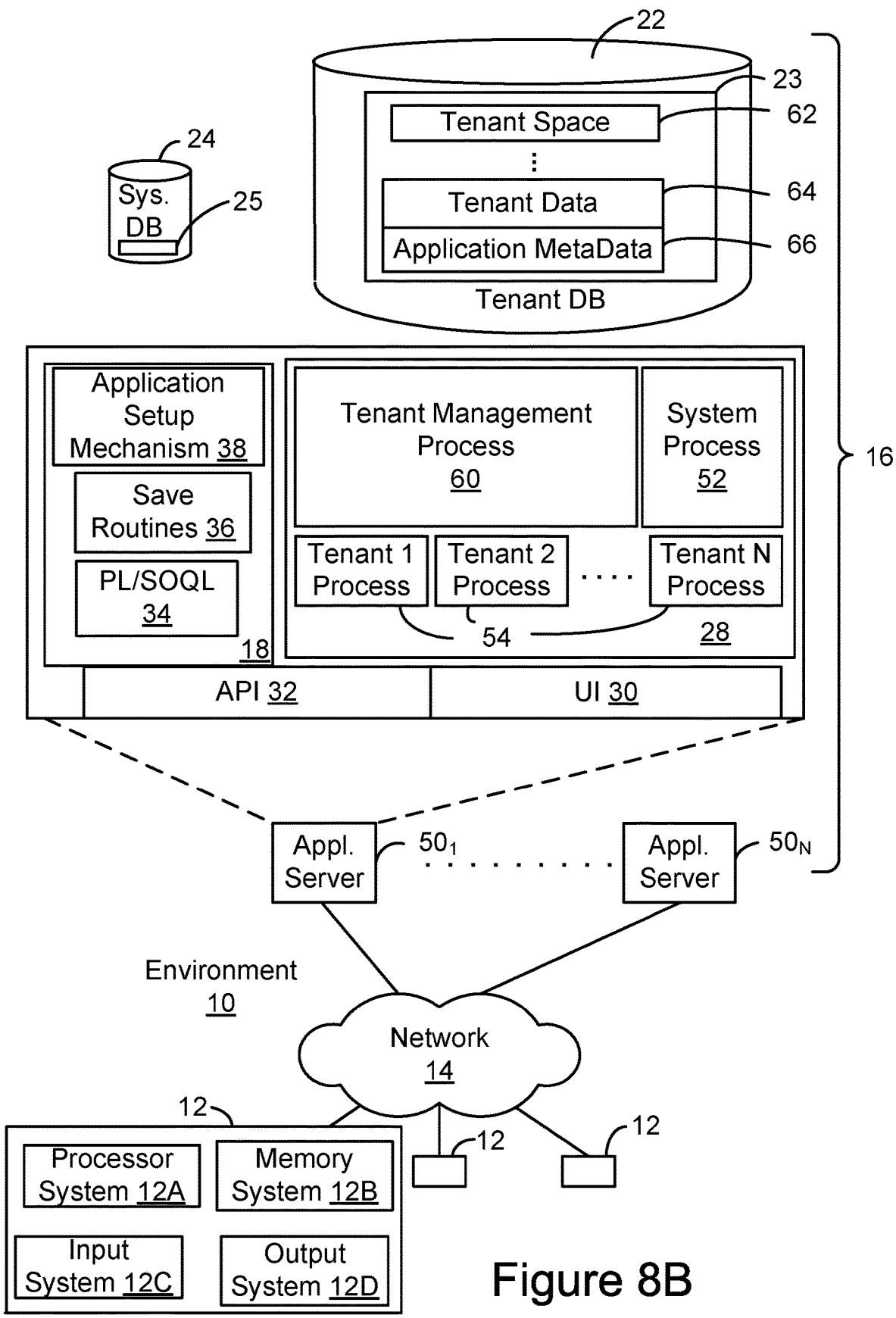
FIG. 8B shows a block diagram of an example of some implementations of elements of FIG. 8A and various possible interconnections between these elements.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
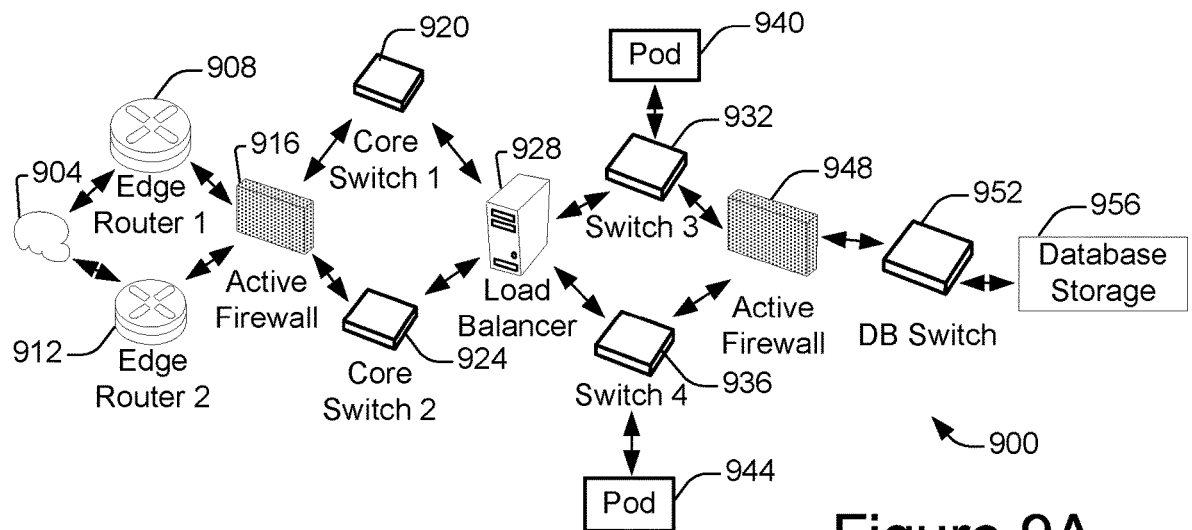
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
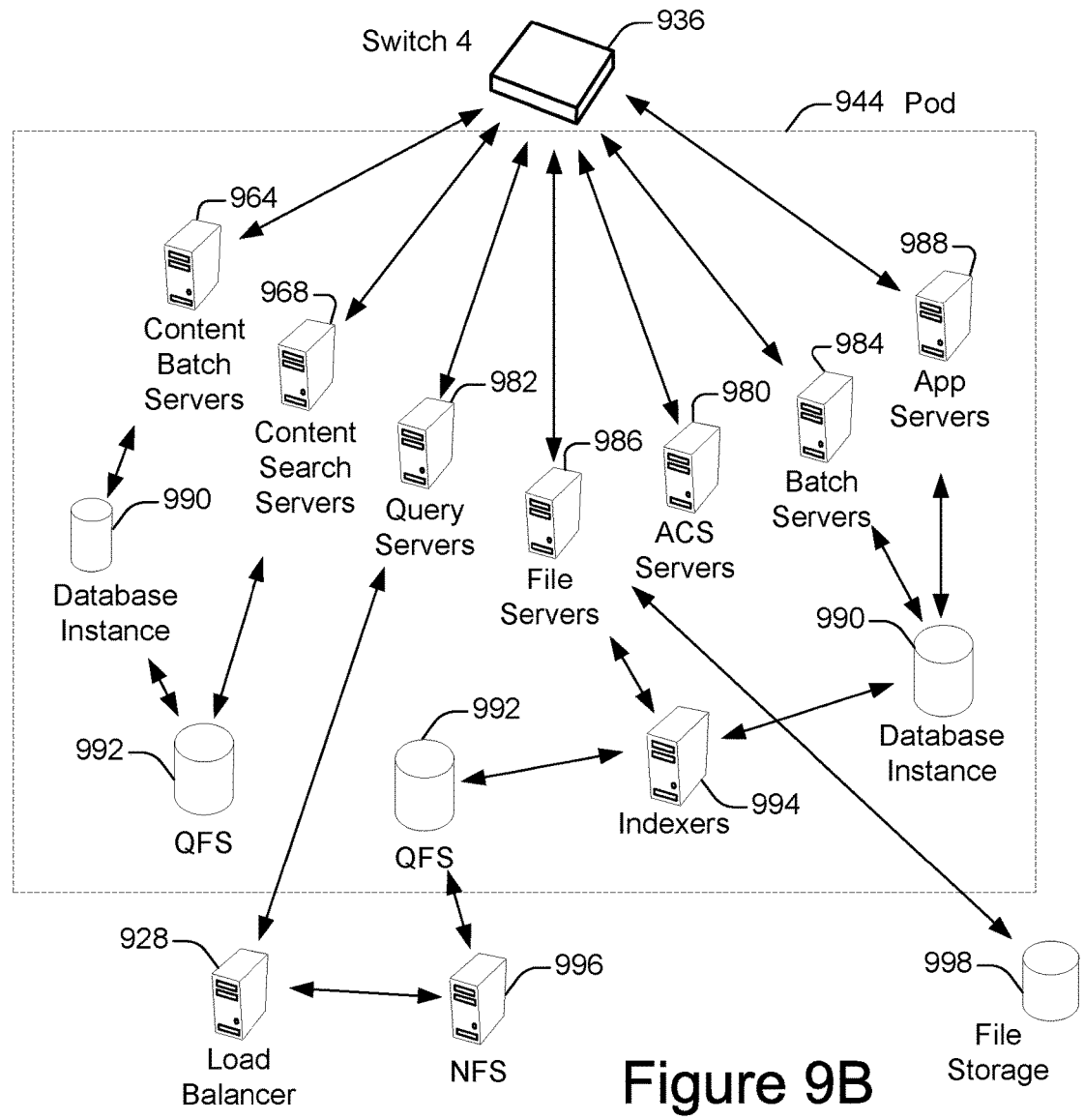
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above with reference to FIGS. 1-7 by instructing another computing device to perform an operation. In some implementations, one or more application servers $50_1$-$50_N$ carry out, either partially or entirely, one or more of the disclosed operations described with reference to FIGS. 1-7. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1-7. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above with reference to FIGS. 1-7. For instance, lists of available communication channels associated with share actions for sharing a type of data item can be maintained in tenant data storage 22 and/or system data storage 24 of FIGS. 8A and 8B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for enabling organizations to connect and engage with customers via channels, the system comprising:
a database system implemented using a server system, the database system configurable to cause:
providing a plurality of channels for customer service, the channels for customer service comprising a text message channel, one or more social channel, and an email channel;
displaying a customer service workspace in a user interface at a user device, the customer service workspace identifying a case stored in a database;
identifying a plurality of knowledge articles that match the case;
displaying the knowledge articles in a knowledge pane in the customer service workspace, the knowledge pane configured to display a plurality of actions associated with the case and capable of being performed responsive to user input, the actions comprising: selecting a knowledge article to cause the knowledge article to open, filtering knowledge articles based on one or more options, copying a URL identifying a knowledge article, emailing a URL identifying a knowledge article, and emailing content of an identified knowledge article;
storing, in the database system, a link between a knowledge article and the case;
associating, responsive to a selection of one of the actions, the selected action with one or more of the channels for customer service;
performing the selected action using the associated one or more channels; and
firing, after performing the selected action, a global event indicating that the selected action has been completed.

2. The system of claim 1, the actions further comprising one or more of: using a search box to enter keywords and search for articles, or displaying results.

3. The system of claim 1, the channels for customer service further comprising one or more of: a chat or a video service.

4. The system of claim 1, the one or more social channels comprising one or more of: Facebook or Twitter.

5. The system of claim 1, the email channel comprising one or more of: a navigate-to email channel or a contextual email channel.

6. The system of claim 1, the customer service workspace comprising a publisher configured for composing and sharing messages using the channels for customer service, the associating of the selected action with the one or more channels for customer service comprising: including a reference to an identified knowledge article in a message in the publisher.

7. The system of claim 6, the publisher comprising a plurality of user-selectable tabs, each tab controlling activation of a respective one of the channels for customer service.

8. A computer program product comprising computer-readable program code capable of being executed by one or more processors when retrieved from a non-transitory computer-readable medium, the program code comprising instructions configurable to cause:
providing a plurality of channels for customer service, the channels for customer service comprising a text message channel, one or more social channel, and an email channel;
displaying a customer service workspace in a user interface at a user device, the customer service workspace identifying a case stored in a database;
identifying a plurality of knowledge articles that match the case;
displaying the knowledge articles in a knowledge pane in the customer service workspace, the knowledge pane configured to display a plurality of actions associated with the case and capable of being performed responsive to user input, the actions comprising: selecting a knowledge article to cause the knowledge article to open, filtering knowledge articles based on one or more options, copying a URL identifying a knowledge article, emailing a URL identifying a knowledge article, and emailing content of an identified knowledge article;
storing, in a database system, a link between a knowledge article and the case;
associating, responsive to a selection of one of the actions, the selected action with one or more of the channels for customer service;
performing the selected action using the associated one or more channels; and
firing, after performing the selected action, a global event indicating that the selected action has been completed.

9. The computer program product of claim 8, the actions further comprising one or more of: using a search box to enter keywords and search for articles, or displaying results.

10. The computer program product of claim 8, the channels for customer service further comprising one or more of: a chat or a video service.

11. The computer program product of claim 8, the one or more social channels comprising one or more of: Facebook or Twitter.

12. The computer program product of claim 8, the email channel comprising one or more of: a navigate-to email channel or a contextual email channel.

13. The computer program product of claim 8, the customer service workspace comprising a publisher configured for composing and sharing messages using the channels for customer service, the associating of the selected action with the one or more channels for customer service comprising: including a reference to an identified knowledge article in a message in the publisher.

14. The computer program product of claim 13, the publisher comprising a plurality of user-selectable tabs, each tab controlling activation of a respective one of the channels for customer service.

15. A computer-implemented method comprising:
providing a plurality of channels for customer service, the channels for customer service comprising a text message channel, one or more social channel, and an email channel;
displaying a customer service workspace in a user interface at a user device, the customer service workspace identifying a case stored in a database;
identifying a plurality of knowledge articles that match the case;
displaying the knowledge articles in a knowledge pane in the customer service workspace, the knowledge pane configured to display a plurality of actions associated with the case and capable of being performed responsive to user input, the actions comprising: selecting a knowledge article to cause the knowledge article to open, filtering knowledge articles based on one or more options, copying a URL identifying a knowledge article, emailing a URL identifying a knowledge article, and emailing content of an identified knowledge article;
storing, in a database system, a link between a knowledge article and the case;
associating, responsive to a selection of one of the actions, the selected action with one or more of the channels for customer service;
performing the selected action using the associated one or more channels; and
firing, after performing the selected action, a global event indicating that the selected action has been completed.

16. The computer-implemented of claim 15, the actions further comprising one or more of: using a search box to enter keywords and search for articles, or displaying results.

17. The computer-implemented of claim 15, the channels for customer service further comprising one or more of: a chat or a video service.

18. The computer-implemented of claim 15, the one or more social channels comprising one or more of: Facebook or Twitter.

19. The computer-implemented of claim 15, the email channel comprising one or more of: a navigate-to email channel or a contextual email channel.

20. The computer-implemented of claim 15, the customer service workspace comprising a publisher configured for composing and sharing messages using the channels for customer service, the associating of the selected action with the one or more channels for customer service comprising: including a reference to an identified knowledge article in a message in the publisher.

* * * * *